United States Patent Office 3,141,541
Patented July 21, 1964

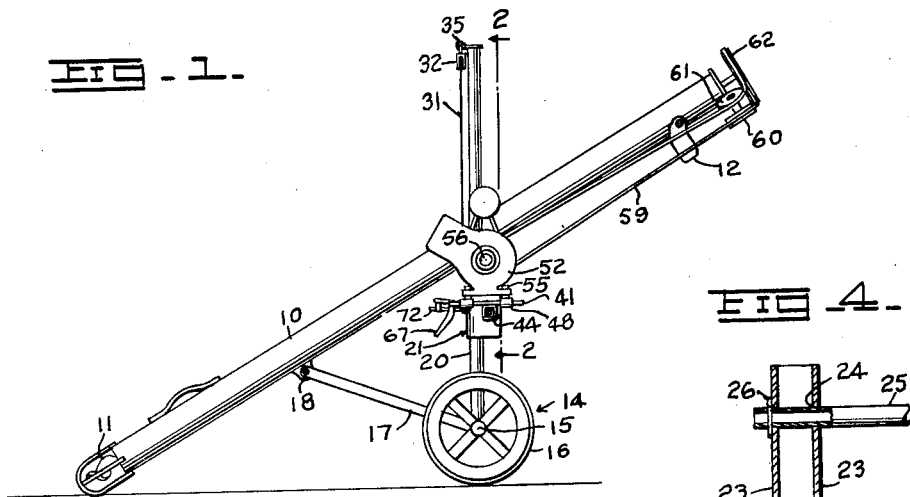
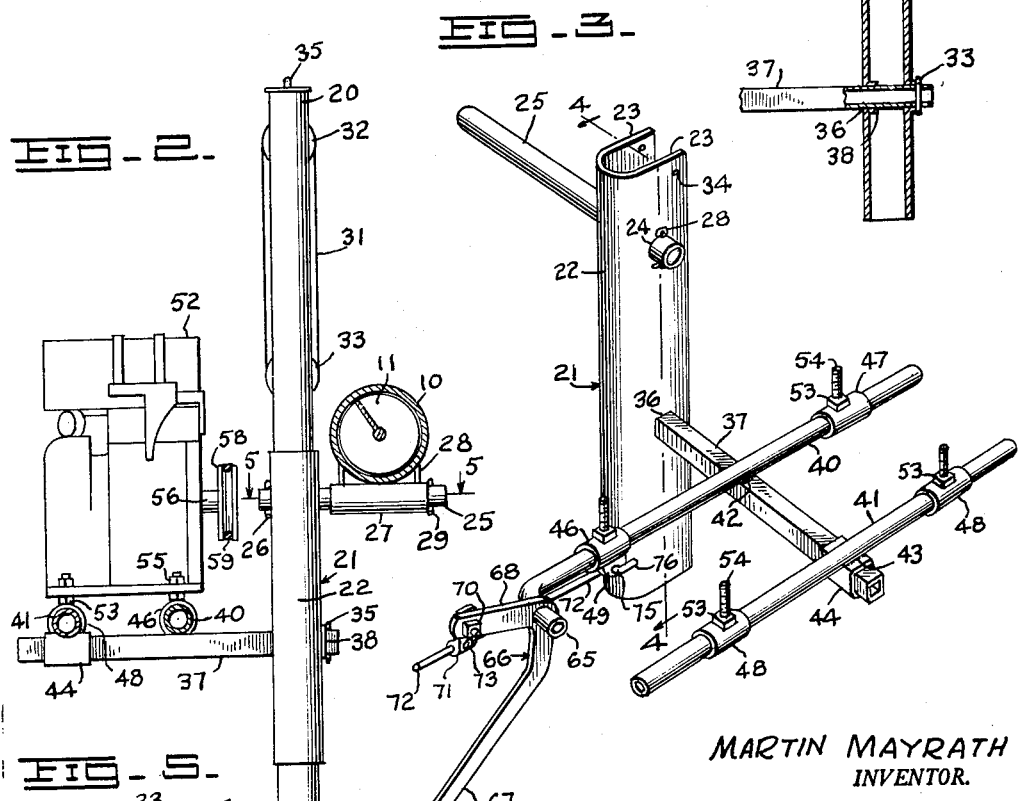

3,141,541
MOTOR OR ENGINE SUPPORT FOR
CONVEYOR
Martin Mayrath, 10707 Lennox Lane, Dallas, Tex.
Filed July 24, 1961, Ser. No. 126,325
5 Claims. (Cl. 198—120.5)

This invention relates to power-operated conveyors and particularly to mobile, self-contained, power conveyors adapted for the loading of grain and the like.

There is in general use a type of conveyor comprising an elongated tube having a conveying auger therein, and the tube of the conveyor is supported on an axle structure intermediate its ends with radius rods connected between the axle structure and the auger tube at a point on the latter which lies between the supporting means connected to the axle structure and the inlet end of the auger tube. Such a mechanism employs a supporting arm for the auger tube, engageable therewith intermediate the ends thereof and movable vertically to adjust the angle of the auger tube to the vertical, and the mechanism has means for mounting the driving motor or engine for the auger for movement vertically with the supporting arm in axial alignment therewith. With such an arrangement, the means provided for raising and lowering the tube to change its angle also raises and lowers the driving motor therewith, thus maintaining substantially constant the driving distance between the motor pulley and the remote pulley means commonly employed for driving the auger.

An important object of the present invention is to provide novel simple means for supporting the motor or engine with its driving shaft always substantially concentric with respect to the pivot axis of the auger tube supporting arm, for movement therewith when the auger tube is adjusted to change the angularity thereof, and at the desired substantially constant distance from the remote or driven pulley.

A further object is to provide for use with a rigid supporting column connected to the axle structure, an improved motor and tube support means vertically slidable on the column and provided with novel means for supporting both the auger tube and the motor with respect to the rigid column.

A further object is to provide, in a conveyor having an auger tube and a motor supporting member movable vertically on a rigid vertical column, a form of such member which is substantially U-shaped in cross-section to be arranged around the supporting column, and connected to such U-shaped member horizontal supports for both the auger tube and motor, the horizontal supports serving also to maintain the rigid column in position within the U-shaped member.

A further object is to provide means of the character referred to wherein the U-shaped member, which fits around the supporting column, may be formed of sheet metal, but which nevertheless provides adequate rigid support for the cantilevered horizontal members which engage and support the auger tube and motor.

A further object is to provide such an arrangement of parts wherein the formation of the U-shaped member in a novel manner, for the projection therethrough of a motor supporting arm, permits it to be made of sheet metal while providing adequate support for the weight of the motor.

Other objects and advantages of the invention will become apparent during the course of the following description.

In the drawing I have shown one embodiment of the invention.

FIGURE 1 is a side elevation of a conveyor embodying the invention;

FIGURE 2 is an enlarged fragmentary sectional view on line 2—2 of FIGURE 1;

FIGURE 3 is a perspective view of the motor and auger tube supporting means separated from the conveyor;

FIGURE 4 is a fragmentary vertical sectional view through the upper end portion of the vertical support taken substantially in the plane 4—4 of FIGURE 3, showing the auger tube and motor supporting arms, and FIGURE 5 is a fragmentary sectional view on line 5—5 of FIGURE 2.

Referring to FIGURE 1, the number 10 designates an auger tube, in which is mounted for rotation a conventional conveying auger 11. The lower end of the tube 10 is adapted to receive grain or other finely divided material to be conveyed upwardly for discharge from a point near the upper end of the tube 10, as through a discharge spout 12. The angularity of the tube 10 is adapted to be changed to adjust the height of discharge of the conveyed material in a manner to be described.

The conveyor tube 10 is adapted to be supported by an axle structure indicated as a whole by the numeral 14 and comprising an axle 15 and the usual supporting wheels 16 connected to the ends thereof. Conventional radius rods 17 are connected to the axle 15 near its ends and converge toward the lower end of the tube 10 and are connected at 18 with the tube 10 between the lower end thereof and the vertical plane of the axle 15.

A conventional supporting column 20 is connected at its lower end to the axle 15 and projects upwardly above the tube 10 in close proximity thereto as shown in FIGURE 2. The column 20 is of circular cross-section, as shown in FIGURE 5. Slidably mounted on the column 20 is a vertical supporting member 21 of substantially U-shape, as shown in FIGURES 3 and 5, the member 21 having a semi-cylindrical portion 22 and flat spaced parallel wall portions 23, extending therefrom tangentially thereof, as also shown in FIGURES 3 and 5. The semi-cylindrical portion of the member 21 fits around the column 20, as shown in FIGURE 5.

Adjacent to its upper end, the slidable support 21 is provided with aligned openings 24 through the flat wall portions 23. A tubular support 25 extends through these openings and is provided at the left of the member 2 in FIGURE 4, with a cotter pin 26 to prevent displacement of the tubular member 25 toward the right of FIGURES 2 and 4. A sleeve 27 (FIGURE 2) is mounted for rotation on the tubular member 25 and is provided with upstanding elements 28, preferably welded to the auger tube 10. The sleeve 27 is retained in position by a cotter pin 29. It will be apparent that the auger tube 10 is supported by the tubular member 25, which, in turn, is supported by the vertically slidable member 21 and, accordingly, vertical movement of the member 21 changes the angularity of the auger tube 10, its lower end normally resting on the ground or in a pile of material to be conveyed.

Conventional means may be employed for effecting vertical movement of the member 21. This may be in the form of a chain hoist, for example, having chain 31 passing around upper and lower pulleys 32 and 33, the latter of which may be connected in any suitable way to the member 21; for example, by means connected with openings 34 (FIGURE 3) in the upper ends of the parallel walls 23. The upper pulley 32 may be connected to the top of column 20 through a suitable bracket 35.

At a point spaced below the openings 24, the member 21 is provided with aligned openings 36, through which extends a supporting arm 37 of polygonal cross-section, preferably square. The arm 37 is adapted to support the driving motor for the conveyor. Since this motor is of substantial weight and the member 21 is formed of sheet metal, the openings 36 are preferably formed by punching openings in the side walls 23 with a punch having an end smaller than the openings 36 and having a tapered section back of the punching edge so that in driving the punch through the metal, the latter is bent to form flanges 38. This provides the arm 37 with bearings substantially wider than the thickness of the metal of the member 21. Displacement of the arm 37 to the left in FIGURES 2 and 4 is prevented by a cotter pin 39.

The tubular member 25 and arm 37 occupy the position relative to the column 20 shown in FIGURE 5, these members locking the slidable member 21 in position on the column 20. Accordingly, the walls 23 provide means for connecting the members 25 and 37 to the member 21, while the members 25 and 37 serve to maintain the slidable member 21 in proper position in engagement with column 20.

The arm 37 supports thereon a pair of spaced parallel tubular rails or motor mounts 40 and 41, the former of which is preferably welded to the arm 37 as at 42. The mount 41 is preferably welded as at 43 to a sleeve 44 corresponding in cross-sectional shape to and slidable on the arm 37.

A pair of slides 46 and 47 are slidable on the mount 40 and similar members 48 are slidable on the mount 41. The slide 47 and the two slides 48 may be identical with each other, while the slide 46 is provided with a depending eye 49 for a purpose to be described. Means are provided for connecting each of the slides 46, 47 and 48 to the base of a motor 52. In the present instance, the head 53 of a bolt 54 is welded to each of the slides with the threaded stem of the bolt projecting upwardly to receive nuts 55 screwed down on the bolts after the stems of the bolts have been inserted through suitable openings in the base of the motor 52.

The motor in the present instance has been shown as a conventional gasoline engine and such engine has a drive shaft 56 preferably arranged in axial alignment with the tubular member 25 for a purpose which will become obvious.

A pulley 58 is mounted on the shaft 56. A belt 59 passes around this pulley and around guiding idler pulleys 60 and 61 (FIGURE 1) suitably supported by the upper end of the tube 10. From the pulleys 60 and 61, the belt turns around a pulley 62 fixed to the shaft of the auger 11 to effect rotation thereof.

As previously stated, the motor shaft 56 is preferably axially aligned with the tubular member 25 and this is true when the motor is operatively connected to the auger to rotate it. Means are provided for shifting the motor to the right in FIGURE 1 to loosen the belt 59 around the pulley 58 when it is desired not to drive the conveyor.

Referring to FIGURE 3, the end of the mount 40 remote from the pulleys 60 and 61 is turned transversely as at 65 to form a pivotal support for a lever 66 having a handle end 67 and an operating end 68. The latter end of the lever is pivotally connected as at 70 to a collar 71 fixed to a rod 72 by a set screw 73. One end of the rod 72 extends transversely as at 75 through the eye 49 and has its extremity 76 bent so as to be parallel to and offset from the body of the rod 72.

*Operation*

The motor 52 drives the belt 59 to rotate the auger 11 in a conventional manner to move grain or other material upwardly through the tube 10. It will be understood that while the present invention has been illustrated in connection with an auger conveyor, it is not necessarily limited to such use.

The vertically slidable member 21 acts as a support for the tubular member 25 and arm 37 and these elements, in turn, respectively support the conveyor tube 10 and motor 52. The chain hoist is operated to move the member 21 and thus move the sleeve 27 and supports 28 to any vertical adjusted position, and such position determines the angularity of the tube 10.

The shaft 56 of the motor has its axis effectively coincidental with the tubular member 25 and such relative position of these two parts is maintained regardless of vertical movement of the slidable member 21. The radius rods 17 fix in predetermined relation the spacing of the axle 15 and the pivot point 18, so that vertical movement of the member 21 raises or lowers the upper end of the tube 10 to determine the elevation of the higher (outlet) end of the tube.

It will be apparent that the tubular member 25 and arm 37 operate also to confine the stem 20 in the semicylindrical portion 22 of the slidable member 21. Accordingly, member 25 and arm 37 may be inserted in position after the member 21 is placed in position around column 20. The members 25 and 37 do not grip the column 20 and, accordingly, the member 21 is free to slide vertically. When it is desired to change the angularity of the conveyor, the chain hoist is operated to move the member 21 upwardly or downwardly, and similar movement, of course, is imparted not only to the tube 10 but also to the motor 52. The proper driving relation between the pulley 58 and the pulleys 60 and 61 is maintained in any vertically adjusted position of the member 21.

If it is desired to release the pulley 58 from driving connection with the belt 59, the lever handle 67 (FIGURE 3) is swung downwardly in counterclockwise turning movement about the end 65 of the mount 40. The rod 72 then imparts movement to the slide 46 to effect movement of the motor 52 to the right in FIGURE 1. Since the motor base is fixed to all of the bolts 54, these elements, together with the motor itself, will be similarly moved to slack the belt 59 and release its driving connection with the pulley 58. When the belt is again to be engaged with the pulley 58, the handle 67 is turned clockwise to move the motor to the left in FIGURE 1.

When the belt is properly tightened, it will be noted that the center of the pivot 70 will pass upwardly and above the horizontal plane of the end 65, thus providing an over-center locking movement of the rod 72 when the motor mount is in driving position. When such position is reached, the rod 72 engages against the bottom of the mount end 65 to prevent further turning movement of the lever 66, and the belt tension holds the parts in this locked position. Proper operation of this mechanism is provided for by the adjustment of the collar 71 along the rod 72 by loosening the set screw 73 and then tightening it in proper position.

The use of relatively inexpensive sheet metal in the making of the member 21 is rendered feasible for the mounting particularly of the arm 37 by the manner in which the openings 36 are punched, the short flanges 38 providing adequate bearing surfaces for carrying the load imposed by the motor 52 on the arm 37 and member 21. This member in the form shown is more economical to manufacture than a tubular sleeve with the members 25 and 37 fixed thereto, and it may be applied more easily. Moreover, if service is necessary, the cotter pins 26 and 33 may be removed, whereupon the tubular member 25 and arm 37 may be removed from the member 21 and the latter removed from the column 20. The wide spacing of walls 23 contributes to the rigid support of the cantilevered outer parts of elements 25 and 37.

From the foregoing, it will be apparent that the present construction provides a highly efficient means for carrying out the functions described. Moreover, the device may be produced very economically and the parts are readily assembled and disassembled.

It is to be understood that the form of the invention shown and described is to be taken as a preferred example of the same and that various changes in the shape, size, and arrangement of the parts may be made without departing from the spirit of the invention or the scope of the appended claims.

What is claimed is:

1. In a conveying mechanism, an inclined conveyor having a lower inlet end and an upper discharge end, a vertical column, a vertically elongated slidable member of U-shaped cross-section having a portion between the longitudinal edges thereof corresponding in shape to said column and having spaced parallel sidewalls projecting tangentially therefrom, whereby said slidable member is movable laterally into position around said column and slidably fitting the latter, means projecting through said sidewalls for supporting said conveyor at a point intermediate the ends thereof whereby vertical movement of said slidable member transmits vertical movement at said intermediate point to said conveyor to change its angularity, and means projecting through said sidewalls for supporting with respect to said slidable member a driving motor for said conveyor, said two means projecting through said sidewalls, closing the space therebetween and slidably engageable with said column and preventing lateral displacement of said slidable member from said column.

2. In a conveying mechanism, an inclined conveyor having a lower inlet end and a upper discharge end, a vertical cylindrical column, a vertically elongated slidable member of U-shaped cross-section having a semi-cylindrical portion corresponding in diameter to said column and having spaced parallel sidewalls projecting tangentially therefrom, whereby said slidable member is movable laterally into position around said column for slidable engagement therewith, said sidewalls having aligned openings near the top thereof, a supporting member projecting through said aligned openings substantially tangentially of said column and having mechanical connection with said conveyor at a point intermediate its length whereby vertical movement of said slidable member moves said intermediate point on said conveyor and changes the angularity of said conveyor, said sidewalls having a second pair of aligned openings, and an arm projecting through the second pair of aligned openings and supporting a driving motor for said conveyor, said supporting member and said arm slidably engaging said column.

3. In a conveying mechanism, an inclined conveyor having a lower inlet end and an upper discharge end, a vertical cylindrical column, a vertically elongated slidable member of U-shaped cross-section having a semi-cylindrical portion corresponding in diameter to said column and having spaced parallel sidewalls projecting tangentially therefrom, whereby said slidable member is movable laterally into position around said column for slidable engagement therewith, said sidewalls being provided near their upper ends with horizontally aligned openings, an arm corresponding in cross-sectional shape to said openings and projecting therethrough and beyond one side of said slidable member, a sleeve surrounding said arm and fixed to said conveyor intermediate its ends whereby vertical movement of said slidable member moves said conveyor at said intermediate point to change its inclination, said sidewalls below said first-named openings having a second pair of horizontally aligned polygonal openings and a second supporting arm corresponding in cross-sectional shape to and projecting through said polygonal openings and beyond the side of said slidable member opposite said first-named arm and adapted to support a driving motor for said conveyor, said arms slidably engaging said column.

4. In a conveyor of the type having a conveyor tube and a drive engine both supported by arms extending transversely from a structure slidable along a substantially vertical column, the improvement which comprises:
 (a) a length of sheet metal constituting said structure, folded to provide a mid-section partially embracing and slidably fitting said column and spaced-apart terminal sections extending parallel to one another to one side of said column,
 (b) said arms passing through respective sets of horizontally-aligned apertures in said terminal sections in slidable engagement with said vertical column, and snugly received in said apertures.

5. A conveyor as recited in claim 4, in which the margins of at least some of said apertures are flanged to provide increased bearing area for the arm received therein.

References Cited in the file of this patent

UNITED STATES PATENTS

| | | |
|---|---|---|
| 308,005 | Steinebrei | Nov. 11, 1884 |
| 2,551,147 | Mayrath | May 1, 1951 |
| 2,592,480 | Slocum | Apr. 8, 1952 |
| 2,998,120 | Hagen | Aug. 29, 1961 |